United States Patent
Crowley et al.

(10) Patent No.: US 6,880,586 B2
(45) Date of Patent: Apr. 19, 2005

(54) COLLAR WITH INTEGRAL VENT FOR FUEL FILLER PIPE

(75) Inventors: Allen G. Crowley, Harbor Beach, MI (US); David D. Chen, Troy, MI (US); Mingchi Michael Tsai, Rochester Hills, MI (US)

(73) Assignee: Dayco Products, LLC, Miamisburg, OH (US)

( * ) Notice: Subject to any disclaimer, the term of this patent is extended or adjusted under 35 U.S.C. 154(b) by 151 days.

(21) Appl. No.: 10/719,130

(22) Filed: Nov. 21, 2003

(65) Prior Publication Data

US 2004/0103956 A1 Jun. 3, 2004

Related U.S. Application Data

(63) Continuation-in-part of application No. 10/170,985, filed on Jun. 13, 2002, now Pat. No. 6,666,238.

(51) Int. Cl.[7] .................................................. B65B 1/04
(52) U.S. Cl. .......................... 141/59; 141/45; 141/286; 220/86.2; 285/80
(58) Field of Search ............................... 141/44, 45, 59, 141/285, 286; 220/86.1, 86.2, 86.3, DIG. 33; 285/73, 75, 80, 81

(56) References Cited

U.S. PATENT DOCUMENTS

| | | |
|---|---|---|
| 2,322,347 A | 6/1943 | Churchman |
| 3,428,337 A | 2/1969 | Read |
| 3,709,526 A | 1/1973 | Cromi |
| 4,027,910 A | 6/1977 | Farelli |
| 4,141,393 A | 2/1979 | Mayer |
| 4,223,706 A | 9/1980 | McGahey |
| 4,405,161 A | 9/1983 | Young et al. |
| 4,544,190 A | 10/1985 | Swift et al. |
| 4,552,394 A | 11/1985 | Kesselman |
| 4,674,778 A | 6/1987 | Ruiz |
| 5,199,471 A | 4/1993 | Hartman et al. |
| 5,213,142 A | 5/1993 | Koch et al. |
| 5,234,036 A | 8/1993 | Burkovich et al. |
| 5,244,017 A | 9/1993 | Hartman et al. |
| 5,271,438 A | 12/1993 | Griffin et al. |
| 5,273,087 A | 12/1993 | Koch et al. |
| 5,289,856 A | 3/1994 | Strock et al. |
| 5,295,914 A | 3/1994 | Milavec |
| 5,325,896 A | 7/1994 | Koch et al. |
| 5,327,943 A | 7/1994 | Strock et al. |
| 5,507,324 A | 4/1996 | Whitley, II et al. |

(Continued)

*Primary Examiner*—Gregory L. Huson
*Assistant Examiner*—Peter deVore
(74) *Attorney, Agent, or Firm*—Joseph V. Tassone; J. Daniel Lykins

(57) ABSTRACT

A fuel filler assembly collar comprising: a first semicircular shaped structure having a first pair of terminal ends which lie in a common vertical plane, each of the terminal ends including at least two locking means, a top edge forming an upper semicircular rim, a bottom edge forming a lower semicircular rim, the top edge and the bottom edge lying in spaced apart horizontal planes with respect to each other, a chamber duct in the top edge of the first semicircular structure, and an outer circumferential side separating the top edge and the bottom edge, and an elbow-shaped tubular structure connected to a fuel vapor vent tube; and a second semicircular shaped structure having a second pair of terminal ends which lie in a common vertical plane, the two terminal ends including at least two locking means, a top edge forming an upper semicircular rim, a bottom edge forming a lower semicircular rim, the top edge and the bottom edge lying in spaced apart horizontal planes with respect to each other, and one or more vent holes, wherein the first semicircular shaped structure and the second semicircular structure are locked together at the first and the second pair of terminal ends.

20 Claims, 3 Drawing Sheets

U.S. PATENT DOCUMENTS

| | | |
|---|---|---|
| 5,520,228 A | 5/1996 | Fink, Jr. et al. |
| 5,590,806 A | 1/1997 | Green et al. |
| 5,673,738 A | 10/1997 | Spaulding |
| 5,791,387 A | 8/1998 | Palvolgyi |
| 5,803,131 A | 9/1998 | Iwasa et al. |
| 5,826,918 A | 10/1998 | Bowles et al. |
| 5,884,958 A | 3/1999 | Oddenino |
| 6,311,734 B1 | 11/2001 | Petrovic |
| 6,330,893 B1 | 12/2001 | O'Connell |
| 6,336,482 B1 | 1/2002 | Cunkle et al. |
| 6,340,093 B1 | 1/2002 | Zapp |
| 6,357,618 B1 | 3/2002 | Kloess et al. |
| 6,666,238 B1 * | 12/2003 | Crowley et al. ............ 141/286 |

* cited by examiner

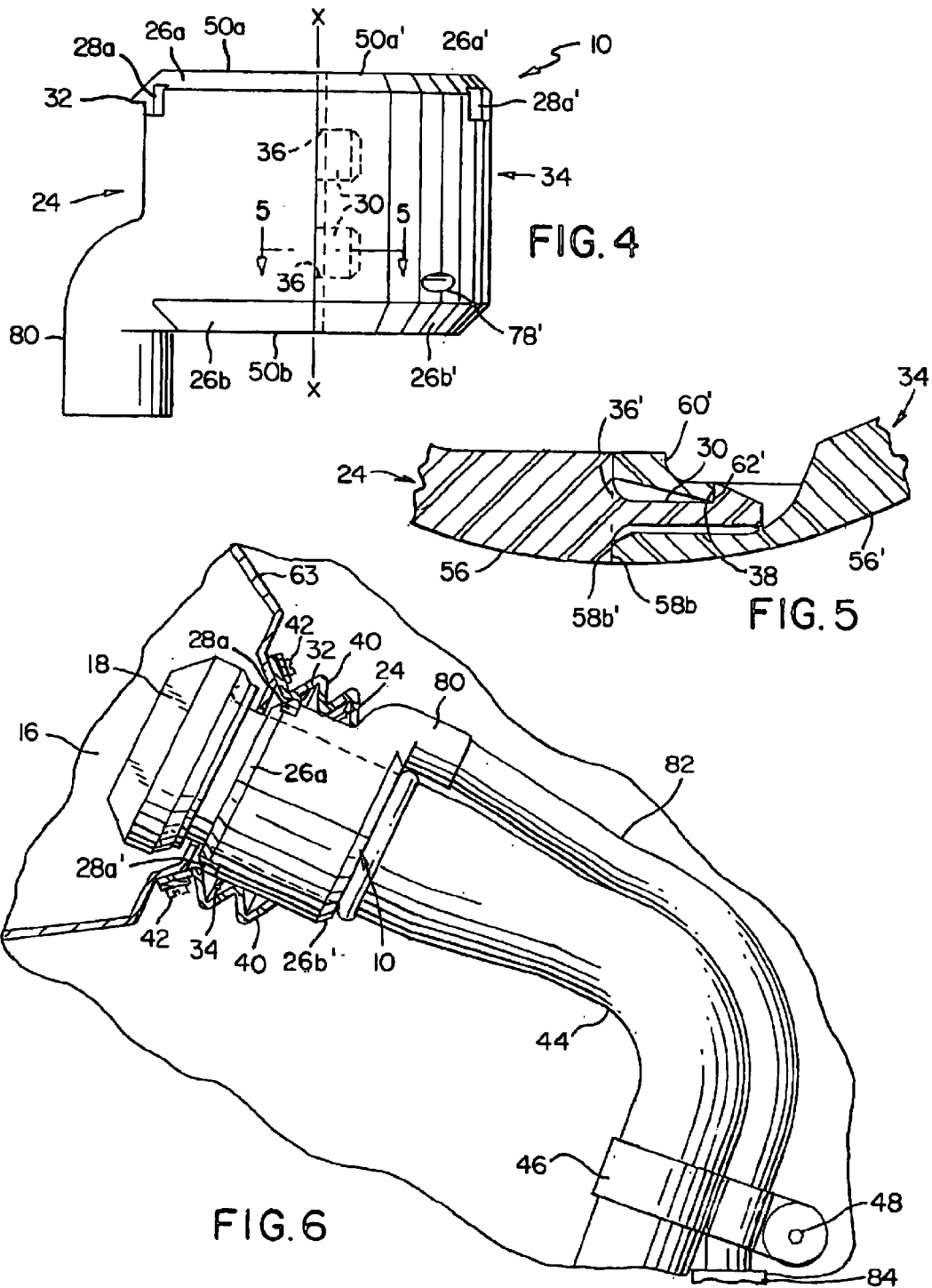

COLLAR WITH INTEGRAL VENT FOR FUEL FILLER PIPE

CROSS-REFERENCE TO RELATED APPLICATIONS

This application is a continuation-in-part of U.S. patent application Ser. No. 10/170,985, filed Jun. 13, 2002, now U.S. Pat. No. 6,666,238.

BACKGROUND OF THE INVENTION

The invention relates generally to fuel filler apparatus connecting a fueling port and a tubular fuel filler pipe in a motor vehicle. More particularly, the invention relates to an improved collar which provides protection for the fuel filler pipe assembly housed in the fuel door recessed compartment of the motor vehicle, provides support for the rubber boot surrounding the fuel filler pipe and prevents fuel vapor from being released to the atmosphere during refueling.

In the manufacture of automobiles, the upper end of the fuel filler pipe leading to the fuel tank is generally closed by a threaded cap or a cap having a bayonet-type connection. The cap may be locked and unlocked by the use of a key. The end of the fuel filler pipe is securely mounted in a recessed fuel filler compartment located on one side of the vehicle body. Typically, the fuel filler cavity further includes a hinged fuel filler door that may contain a locking mechanism.

The fuel filler pipe is characterized as having a cup-shaped end provided with an annular flange around its perimeter. The annular flange is seated around an opening in the fuel filler cavity that leads to the interior of the fuel filler pipe by placing resilient material between the annular flange of the fuel filler pipe and the edge of the opening in the fuel filler cavity. Typically, the fuel filler pipe is provided with a second annular flange which defines a seat or throat area between the vehicle body and the second annular flange for accommodating a suitable retaining member by means of which the fuel filler terminal can be mounted in the fuel filler seat. Such assembly is described in U.S. Pat. No. 4,027,910 to Farelli.

In the assembly of the fuel pipe to the automobile body, a rigid collar is commonly employed as a protecting member for the fuel filler pipe and also as a support for a rubber boot surrounding the fuel assembly to allow escape of fresh air.

One rigid collar commonly used in the industry to protect and support the fuel filler pipe comprises three individual lightweight plastic sections which are not only difficult to assemble but the construction of the three parts requires at least two separate actions involving at least two different directional motions in order to lock the three individual plastic parts together in a sub-assembly while connecting the fuel pipe to the vehicle. In a first action, two halves of the collar are aligned and fitted together and, in a second action, a third annular collar is forced around the out r surfaces of the two halves in a secure manner to hold the two parts together. Accordingly, there is a need to provide a more simple collar assembly which comprises fewer separate parts, is easier and faster to assemble, and uses a more straight forward approach to lock the part together while incorporating therein an integral fuel vent line.

SUMMARY OF THE INVENTION

It is an object of the present invention to provide a fuel filler collar which is designed to overcome the above drawbacks of known fuel filler collars, and more specifically to provide a tubular collar which comprises no more than two separate parts which mate in a simple, single, straight forward push-in action to securely lock the two parts together. One such fuel filler collar is described in allowed, commonly assigned U.S. patent application Ser. No. 101 70,985, the contents of which are incorporated herein by reference thereto. U.S. patent application Ser. No. 10/170, 985 forms the basis for the present continuation-in-part application wherein it is a particular object of the present invention to provide such fuel filler collar with an integral fresh air vent line.

The present Invention represents an advancement over the above-referenced predecessor application which describes a tubular collar for sealing a fuel filler assembly in a motor vehicle comprising two separate longitudinally semicircular shaped or C-shaped parts which are interlocked together to form a tubular collar around the fuel filler assembly at the upper end of the fuel filler pipe. Each end of the semicircular parts contains a male and/or female locking surface aligned to mate with the corresponding female and/or male locking surfaces on a similar end of an opposing semicircular shaped part. More specifically, when the ends of the two semicircular shaped parts face each other, the male elements on the ends of the semicircular shaped part readily interlock with the female elements on the facing ends of the opposing semicircular shaped part. The configuration or positional alignment of the male and female surfaces on the ends of the semicircular are such that the two parts can be mated only in the desired configuration. For example, each end of one semicircular part may contain a male surface and a female surface wherein the male surface at one end of the semicircular part is of a different size or other differentiating feature than the male surface on the other end of the semicircular part. A configuration wherein both ends of a semicircular shaped part contains only male surfaces and both ends of the other semicircular shaped part contains only female surfaces has been found to be particularly satisfactory in carrying out locking feature of the collar of the present invention. It is to be understood, of course, that the female surfaces corresponding to the male surfaces are configured or sized to radily accept the corresponding male surfaces.

Ever increasing environmental regulations, now require that fuel filler systems prevent or significantly reduce the amount of fuel vapor being released to the atmosphere. Earlier fuel systems simply allowed the fuel vapors to escape through the filling port or, later fuel systems provided a separate port in the fuel line so that the fuel vapors could be released in a more indirect location. More recent legislation has now required that the fuel vapor being generated by the refueling of the vehicle be significantly reduced or even eliminated in some areas.

In accordance with the present invention, an elbow-shaped tubular member is integrated into the fuel filler collar wherein one end of a fresh air vapor vent line is connected to the distal end of the tubular elbow and the other end of the fuel vapor line is connected to a fuel vapor emissions canister which contains a bed of adsorbent material capable of adsorbing sufficient quantities of fuel vapor from the fuel tank, preferably, the adsorbent material is carbon, and most preferably, activated carbon. Typically, the emissions canister is also connected to the automotive engine so that the adsorbed fuel vapor is eventually recycled to the engine where it is consumed.

Typically, the fuel filler collar includes an opening, preferably at or near the top of the collar wherein fresh air separated from fuel vapor in the emissions canister is vented to the atmosphere.

According to the present invention, the tubular collar for sealing the assembly in a motor vehicle comprises two separate longitudinally semicircular shaped or C-shaped parts which conveniently interlock together to form a tubular collar around the fuel filler assembly at the under end of the fuel filler pipe. Each end of the semicircular parts contains a male and a female locking surface aligned to mate with corresponding female and male locking surfaces on a similar end of an opposing semicircular shaped part. More specifically, when the ends of the two semicircular shaped parts face each other, the male elements on the ends of the semicircular shaped part readily interlock with the female elements on the facing ends of the opposing semicircular shaped part. The positional alignment of the male and female surfaces are preferably reversed in the opposite end of the same semicircular shaped part. In a preferred aspect of the invention, the male and female locking surfaces on one end of each semicircular shaped part are of a different size or other configuration to allow the semicircular shaped parts to be coupled together only in the desired alignment as discussed in further detail below.

In accordance with the invention, the two longitudinal semicircular shaped parts are easily locked together using a simple, single push-in motion to lock the two semicircular shaped parts securely together and form a collar around the fuel filler assembly.

BRIEF DESCRIPTION OF THE DRAWINGS

FIG. 4 is a side view of the collar-sealing member of the present invention;

FIG. 5 is a cross-sectional view taken along lines 5—5 of FIG. 4 showing the male and female locking members in a locked position;

FIG. 6 is a partial view of an automobile showing a side view of a fuel filler compartment, fuel filler assembly and fuel filler pipe.

DETAILED DESCRIPTION OF THE INVENTION

Figure 1:
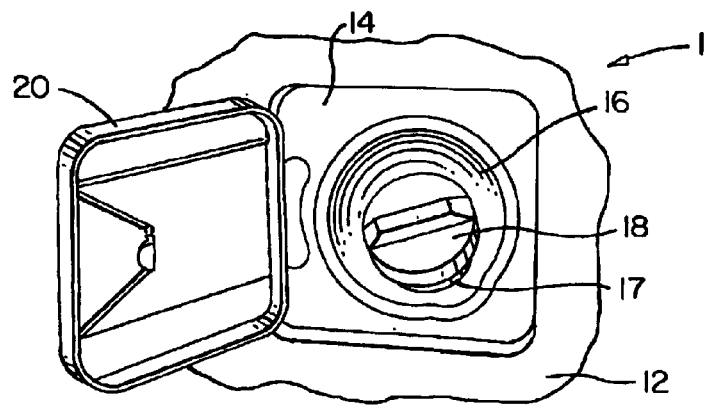
FIG. 1 is a partial view of an automobile fueling port showing a front elevational view of a fuel filler compartment.

With reference to FIG. 1, there is illustrated a typical fueling port 1 for introducing fuel into an automobile through a fuel nozzle (not shown) from a fuel source (not shown). The fueling port may be located on a rear panel 12 of an automobile. The fueling port consists of an inner panel 14, a recessed compartment 16, a tubular inlet 17 for accepting a cap 18, a hinged door 20 and a locking member for securing the door to the panel 12.

Turning to FIGS. 2 through 5, there is illustrated a novel collar 10 and connecting means for protecting a fuel assembly in a fueling port of an automobile. The collar 10 consists of two halves. Each half of the collar has a semicircular shaped structure that is similar, but not identical, to each other with respect to their structures.

Figure 2:
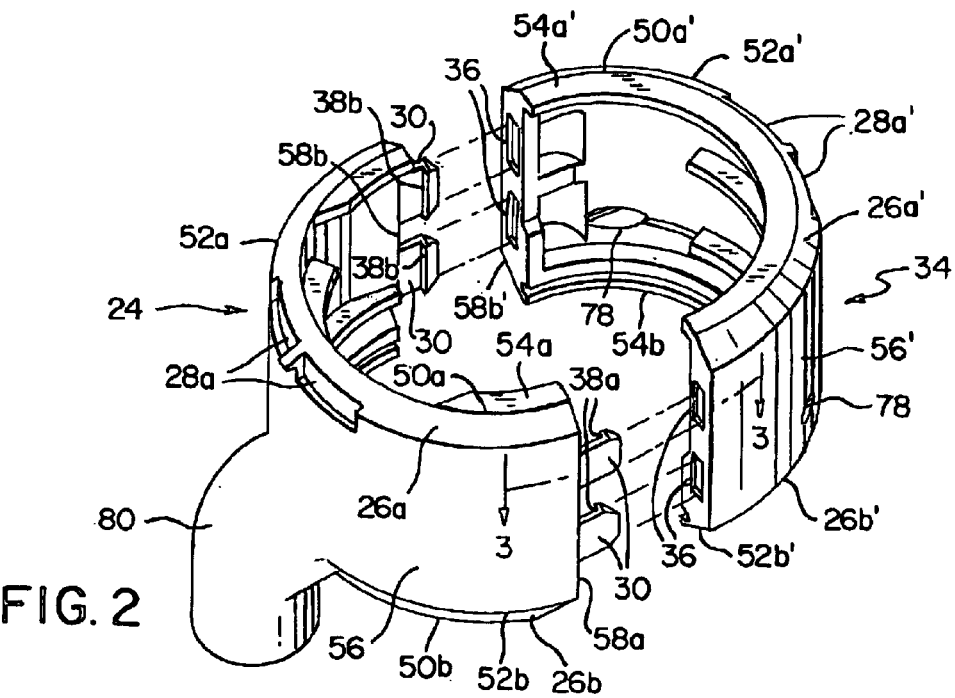
FIG. 2 is an exploded perspective view of the collar-sealing member of the present invention.
Figure 3:
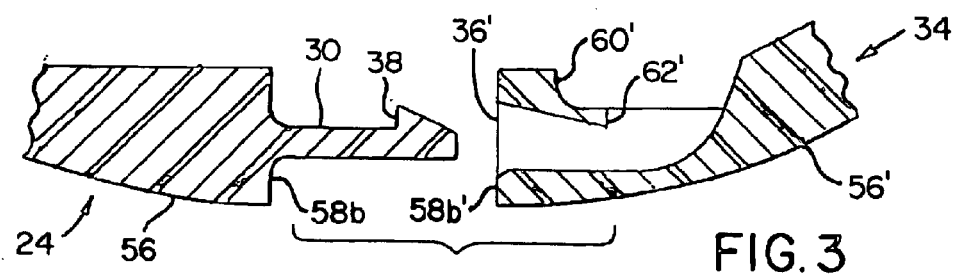
FIG. 3 is a cross-sectional view taken along lines 3—3 of FIG. 2 showing the male and female locking elements in an unlocked position.
Figure 7:
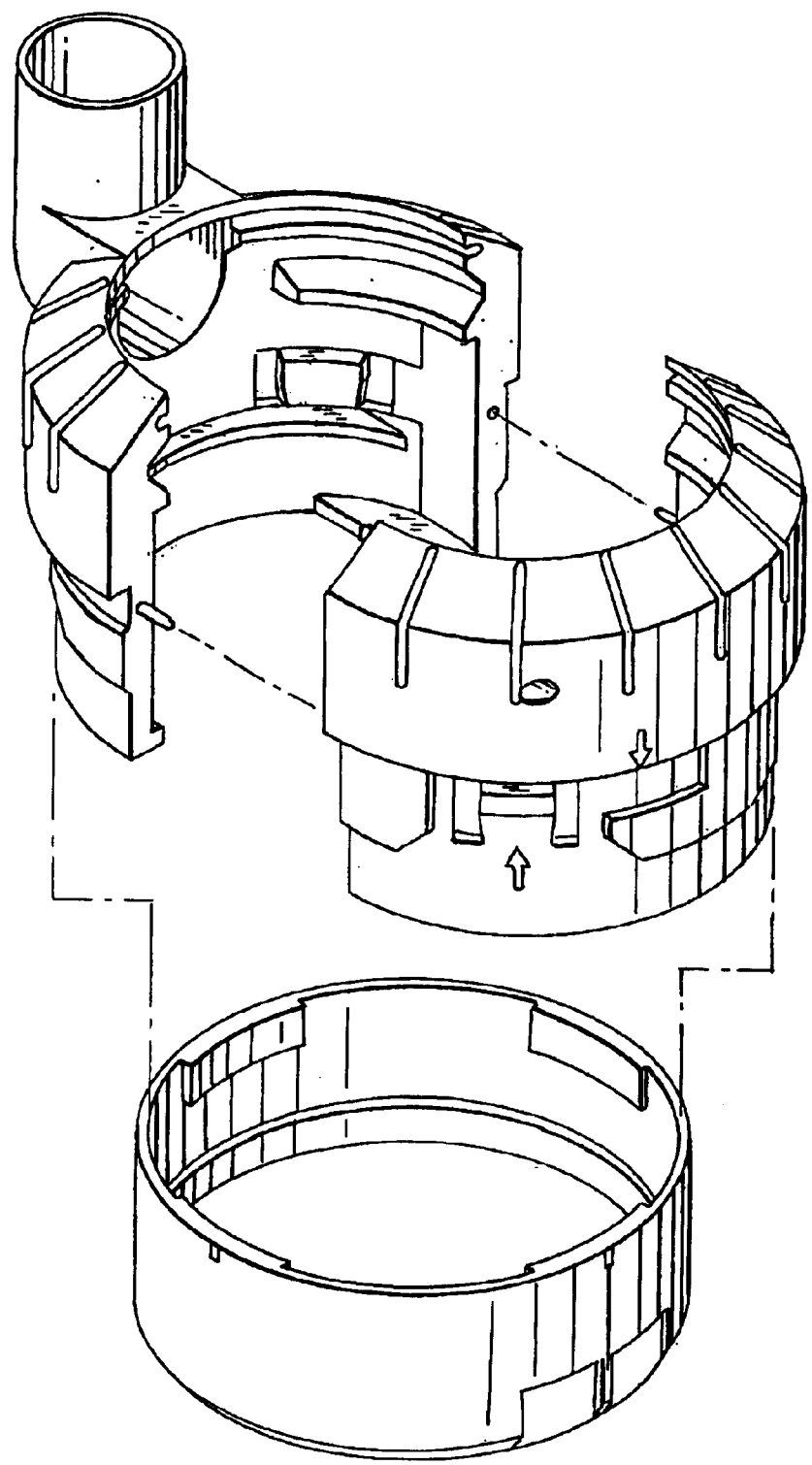
FIG. 7 is an exploded perspective view of a prior art collar-sealing member.

As shown in FIG. 2, the fuel filler collar 10 of the invention comprises a first half that exhibits a semicircular shaped structure 24. At both the upper edge 52a and the lower edge 52b, respectively, of the first semicircular shaped structure 24, the structure 24 tapers inwardly to form an upper tapered arcuate surface 26a and a lower tapered arcuate surface 26b. Upper tapered surface 26a terminates in upper shoulder 50a forming an upper arcuate rim 54a, and lower tapered surface 26b terminates in lower shoulder 50b forming a lower arcuate rim 54b. Both shoulders 50a and 50b extend inwardly perpendicularly to the longitudinal axis X of the fuel filler collar structure 10.

The first C-shaped structure 24 includes a plurality of notches 28a in the upper region, of outer surface 56 of the first semicircular shaped structure 24. The upper notch s 28a and the lower notches 28b further extend into the upper tapered surface 26a and the lower tapered surface 26b, respectively. Associated with the lower notches 28b, there are also included outwardly extending arm members 32 and 32' (FIG. 4) each of which cooperates with boot 40 (FIG. 6) to provide an air passage for outside air into the fill nozzle by forcing the boot to deform over the arm members 32 and 32'.

At each of the ends 58a and 58b of the first semicircular shaped structure, there is formed a plurality of coupling members designed to cooperate with a similar plurality of corresponding coupling members formed on each of the ends 58a' and 58b' of the second semicircular shaped structure to provide the collar of the invention. Preferably, the coupling member is a male/female connection as shown in FIGS. 2 through 5 and more fully described below.

FIG. 2 also illustrates a second semicircular shaped structure 34 similar to the first semicircular shaped structure 24. The second semicircular shaped structure 24 includes a plurality of notches in the upper and lower regions of outer surface 56' equivalent to those shown in the first semicircular shaped structure 24; however, only one of the notches, 28a' is visible in the second semicircular shaped structure shown in FIG. 2. The upper notches 28a' and the lower notches 28b' (FIG. 4) further extend into the upper tapered surface 26a and the lower tapered surface 26b, respectively.

The first semicircular shaped structure includes an elbow-shaped tubular member 80 extending from the outer surface of the semicircular shaped structure. The inner surface 76 of the elbow-shaped tubular member 80 communicates with the interior of the semicircular shaped structure to which the elbow-shaped tubular member 80 is attached. The distal end of the elbow-shaped tubular member 80 includes means for connecting to one end of a vent tube 82 (FIG. 6). The other end of the vent tube 82 is secured to a fuel emissions canister 84.

In addition to the elbow-shaped tubular member 80 on one of the semicircular shaped structures, there is also included, preferably on the opposite semicircular structure, at least one opening 78 which communicates with both the atmosphere outside the collar and with the interior chamber of the collar. The opening 78 (shown in FIG. 2 as a pair of holes) serves as a drain to eliminate any water formed by condensation in the interior chamber of the collar.

During the fueling operation, fuel vapor and air are purges from the fuel tank through the carbon canister where the carbon adsorbs and filters out fuel vapor leaving only fresh air to escape through the air tube 82 Into the Interior of the collar 10 where it eventually escapes through holes 78 into the atmosphere.

At each of the ends 58a' and 58b' of the second semicircular shaped structure 34, there is formed a plurality of coupling members designed to coop rate with a similar plurality of corresponding coupling members formed on each of the ends 58a and 58b of the first semicircular shaped structure 24 to provide the collar of the invention. As with the coupling members of the first semicircular shaped structure 24, the coupling members of the second semicircular shaped structure 34 are preferably a male/female connection.

At both the upper edge 52a' and the lower edge 52b' of the second semicircular shaped structure 34, the structure 34 tapers inwardly, respectively to form an upper tapered arcuate surface 26a' and a lower tapered arcuate surface 26b'. Upper tapered surface 26a' terminates in an upper shoulder 50a' forming an arcuate rim 54a', and lower tapered surface 26b' terminates in lower shoulder 50b' forming a lower arcuate rim 54b'. Both shoulders 50a' and 50b' extend inwardly perpendicularly to the longitudinal axis of the fuel filler collar structure 10.

Turning now to FIGS. 4 and 5 which illustrate the fuel collar 10 of the invention wherein the first semicircular shaped structure and the second semicircular shaped structure are securely locked together, there is illustrated a novel collar 10 and connecting means for protecting a fuel assembly in a fueling port of an automobile. The collar 10 consists of two halves locked together. Each half of the collar 10 comprises a semicircular shaped structure, 24 and 34 that are similar, but not identical, to each other with respect to their structures.

FIG. 5 illustrates one of the plurality of male/female coupling members useful for locking the ends 58a and 58b of the first semicircular shaped structure to the ends 58a' and 58b', respectively, of the second semicircular shaped structure in a manner that provides the fuel filler collar of the invention. As shown in FIG. 5, a tabular member 30 protrudes from the end 58b of the first semicircular shaped structure and includes a catch 38 which, upon being inserted into the opening 36, is resiliently deformed until the catch passes the end 62' of locking member 60', whereupon the catch 38 grasps the end 62' of locking member 60'. It is to be understood that the other coupling members cooperate in a similar manner to complete the locking process.

FIG. 6 illustrates a fuel filler system 70 that includes a fuel filler pipe 44 connected to a recessed compartment 16 on an automobile interior panel 14. The fuel filler pipe 44 is secured to the interior automobile panel 14 using, for example, a band connection 46 attached to the interior automobile panel with a mounting means 48 such as a screw, bolt, pin or the like. The upper end of the fuel pipe contains a shoulder member 39 to retain the collar 10. A flexible, corrugated boot 40 is positioned between the upper indentations or notches 28a, 28a' and the lower indentations 28b and 28b'. The flexible corrugated boot 40 is further attached to the underside 63 of the recessed compartment 16 by fastening means 42, such as screws, bolts, pins, etc.

Placing the collar 10 on the fuel filler assembly is an easy one-motion step that comprises aligning the two C-shaped structures 24 and 34 and then simply pushing the two semicircular shaped structure 24 and 34 together until locking of the parts is achieved.

The two structures described herein to form the collar of the present invention have be n defined as being semicircular shaped. By semicircular shaped structure it is meant that the structure is a C-shaped structure wherein the outer diameter is larger than the inner diameter. The outer diameter is measured between a point on the outer circumferential edge of one end of the C-shaped structure and a corresponding point on the outer circumferential edge of the other end of the C-shaped structure to determine the outer diameter of the C-shaped structure, and the inner diameter is measured between a point on the inner circumferential edge of one end of the C-shaped structure and a corresponding point on the inner circumferential edge of the other end of the C-shaped structure to determine the inner diameter of the C-shaped structure.

The collar of the invention is made from a rigid material, preferably a polymeric material such as polyolefins, e.g., polypropylene, high density polyethylene, etc.; nylons; halogenated polyolefins, such as fluoropolymers and copolymers; polyethyleneterephthalate; and the like; and mixtures and blends thereof. Polypropylene has been found to be particularly effective in manufacturing the collar of the present invention.

Alternative structure means and other changes may be made to the collar and to the assembly of the specific parts of the collar of the present invention; however, it is to be understood that such alternative means and other changes are intended to be within the scope of the appended claims.

What is claimed is:

1. An annular fuel filler assembly collar, said annular collar formed from two interlocking structures comprising:
   a) a first semicircular shaped structure having an outer surface and an inner surface, including;
      a first pair of terminal ends residing in a common vertical plane, each of said terminal ends including at least one locking means;
      a top edge forming an upper semicircular rim having a surface perpendicular to the longitudinal axis of said first semicircular shaped structure;
      a semicircular chamber duct in said top edge, intermediate said pair of terminal ends, said semicircular chamber duct extending from said outer surface to said inner surface;
      a bottom edge forming a lower semicircular rim having a surface perpendicular to the longitudinal axis of said second semicircular shaped structure, said top edge and said bottom edge residing in spaced apart horizontal planes with respect to each other;
      a first outer circumferential side separating said top edge and said bottom edge;
      one or more notches in the upper surface of said first circumferential side intermediate said pair of terminal ends; and
      an elbow-shaped tubular member integrally formed on said first semicircular member intermediate said first pair of terminal ends, said elbow-shaped tubular member extending outwardly and downwardly from said bottom edge of said first semicircular shaped structure and intermediate said pair of terminal ends, said elbow-shaped tubular member communicating with the inner surface of said first semicircular shaped tubular structure, and
   b) a second semicircular shaped structure including;
      a second pair of terminal ends residing in a common vertical plane, each of said terminal ends including at least one locking means,
      a top edge forming an upper semicircular rim having a surface perpendicular to the longitudinal axis of said second semicircular shaped structure;
      a bottom edge forming a lower semicircular rim having a surface perpendicular to the longitudinal axis of said second semicircular shaped structure, said top edge and said bottom edge residing in spaced apart horizontal planes with respect to each other;
      a second outer circumferential side separating said top edge and said bottom edge;

one or more notches in the upper surface of said outer circumferential side intermediate said pair of terminal ends; and one or more spaced apart openings in the lower surface of said second semicircular shaped structure, wherein said first semicircular shaped structure and said second semicircular structure are locked together at said first and said second pair of terminal ends in a simple one-motion step by pushing said structures together until locking of said structures is accomplished, said locking being accomplished in the absence of a separate annular locking structure.

2. The collar of claim 1 wherein said first semicircular shaped structure further comprises a vent tube having a first end connected to said elbow-shaped tubular member and a second end connected to a fuel vapor adsorption canister, for transporting fresh air therefrom.

3. The collar of claim 1 wherein each of said terminal ends in said first semicircular structure includes at least one locking member and each of said terminal ends in said second semicircular structure includes at least one corresponding locking member.

4. The collar of claim 3 wherein said at least one locking member in each of said terminal ends in said first semicircular structure comprises at least one protruding shaft having a barbed member extending from the terminal end of said protruding shaft, said protruding shaft designed to be inserted into a corresponding opening and coupled therewith, and wherein said second locking member in each of said terminal ends in said second semicircular structure comprises at least one corresponding opening designed to accept said at least one corresponding protruding shaft.

5. The collar of claim 4 wherein said at least one locking member on each of said terminal end in said first semicircular structure comprises at least one protruding shaft and said at least one locking member on each of said terminal ends in said second semicircular structure comprises at least one opening corresponding to said at least one protruding shaft wherein said at least one protruding shaft and said at least one corresponding opening are configured such that said first semicircular structure and said second semicircular structure can be locked together in only one way to form said annular, fuel filler assembly collar.

6. The collar of claim 1 wherein said at least one locking member on a first end of said first semicircular structure comprises a first protruding shaft having a first configuration and a second protruding shaft having a second configuration, and said at least locking member on a first end of said second semicircular structure comprises a first opening corresponding to said first protruding shaft and a second opening corresponding to said second protruding shaft.

7. The collar of claim 1 wherein said first semicircular structure and said second semicircular structure further includes an upper shoulder area tapered inwardly from said outer circumferential side to said top edge and extending uniformly from one of said pair of terminal ends to the other of said terminal ends.

8. The collar of claim 1 wherein said first semicircular shaped tubular structure and said second semicircular shaped tubular structure further includes a lower shoulder area tapered inwardly from said outer circumferential side to said bottom edge and extending uniformly from one of said pair of terminal ends to the other of said terminal ends.

9. The collar of claim 1 wherein said first semicircular structure further includes a barb member extending outwardly from said upper surface intermediate said pair of terminal ends.

10. The collar of claim 1 wherein said first semicircular tubular structure and said second semicircular tubular structure are made from a rigid plastic material.

11. The collar of claim 10 wherein said plastic material is selected from the group consisting of polypropylene, high density polyethylene, nylon, polyethyleneterephthalate and halogenated polyolefins.

12. The collar of claim 11 wherein said plastic material is polypropylene.

13. A plastic fuel filler assembly collar comprising:
a) a first semicircular shaped structure having an outer surface and an inner surface, including;
   first and second terminal ends residing in a common vertical plane wherein said first terminal end includes a pair of protruding shafts and said second terminal end includes a second pair of protruding shafts, said first pair of protruding shafts being of a first configuration and said second pair of protruding shafts being of a second configuration;
   a top edge forming an upper semicircular rim having a surface perpendicular to the longitudinal axis of said first semicircular shaped structure;
   a semicircular chamber duct in said top edge, intermediate said pair of terminal ends, said semicircular chamber duct extending from said outer surface to said inner surface;
   a bottom edge forming a lower semicircular rim having a surface perpendicular to the longitudinal axis of said second semicircular shaped structure, said top edge and said bottom edge residing in spaced apart horizontal planes with respect to each other;
   a first outer circumferential side separating said top edge and said bottom edge;
   one or more notches in the upper surface of said first circumferential side intermediate said pair of terminal ends;
   an elbow-shaped tubular member integrally formed on said first semicircular structure, said elbow-shaped tubular member extending outwardly and downwardly from said bottom edge of said first semicircular shaped structure and intermediate said pair of terminal ends, said elbow-shaped tubular member communicating with the inner surface of said first semicircular shaped tubular structure;
   and a vent tube, said vent having a first end connected to said elbow-shaped tubular member and a second end connected to a fuel vapor adsorption canister, for transporting fresh air therefrom; and
b) a second semicircular shaped structure including:
   first and second terminal ends residing in a common vertical plane wherein said first terminal end includes a first pair of openings having a configuration conforming to the first pair of protruding shafts on the first terminal end of said first semicircular shaped structure and said second terminal end includes a second pair of openings having a configuration conforming to the second pair of protruding shafts on the second terminal end of second semicircular shaped structure;
   a top edge forming an upper semicircular rim having a surface perpendicular to the longitudinal axis of said second semicircular shaped structure;
   a bottom edge forming a lower semicircular rim having a surface perpendicular to the longitudinal axis of said second semicircular shaped structure, said top edge and said bottom edge residing in spaced apart horizontal planes with respect to each other;

a second outer circumferential side separating said top edge and said bottom edge;

one or more notches in the upper surface of said outer circumferential side intermediate said pair of terminal ends; and one or more spaced apart openings in the low r surface of said second semicircular shaped structure, wherein said first semicircular shaped structure and said second semicircular shaped structure are locked together at said first and said second pair of terminal ends in a simple one-motion step by pushing said structures together until locking of said structures is accomplished, said locking being accomplished in the absence of a separate annular locking structure.

14. The plastic collar of claim 13 wherein said plastic collar is made from a polymeric material selected from the group consisting of polypropylene, high density polyethylene, nylon, polyethyleneterephthalate and halogenated polyolefins.

15. The plastic collar of claim 14 wherein said polymeric material is polypropylene.

16. In a fuel filler system including a fuel filler pipe attached at its lower end to a fuel receiving tank and at its upper end to a fuel filler inlet tube adapted to receive a fuel cap, a vent tube, a fuel filler assembly collar surrounding said fuel pipe and a rubber boot surrounding said fuel filler assembly collar, said fuel filler assembly collar comprising a three-component collar which includes a first semicircular member, a second semicircular member and an annular unitary circumferential member wherein the first semicircular member and the second semicircular member are placed together in a first action to form a sub-assembly and, in a second different directional action, the sub-assembly is locked together using an annular unitary structure wherein the annular unitary structure is snapped in place around the sub-assembly, the improvement comprising:

employing, as the fuel filler assembly collar, a two component plastic collar to surround said fuel filler pipe, said two component collar comprising:

a) a first semicircular shaped structure having an outer surface and an inner surface, including;

first and second terminal ends residing in a common vertical plane wherein said first terminal end includes a pair of protruding shafts and said second terminal end including a second pair of protruding shafts, said first pair of protruding shafts being of a first configuration and said second pair of protruding shafts being of a second configuration;

a top edge forming an upper semicircular rim having a surface perpendicular to the longitudinal axis of said first semicircular shaped structure;

a semicircular chamber duct in said top edge, intermediate said pair of terminal ends, said semicircular chamber duct extending from said outer surface to said inner surface;

a bottom edge forming a lower semicircular rim having a surface perpendicular to the longitudinal axis of said second semicircular shaped structure, said top edge and said bottom edge residing in spaced apart horizontal planes with respect to each other;

a first outer circumferential side separating said top edge and said bottom edge;

one or more notches in the upper surface of said first circumferential side intermediate said pair of terminal ends; and an elbow-shaped tubular member extending outwardly and downwardly from said bottom edge of said first semicircular shaped structure and intermediate said pair of terminal ends, said elbow-shaped tubular member communicating with the inner surface of said first semicircular shaped tubular structure, and b) a second semicircular shaped structure including:

first and second terminal ends residing in a common vertical plane wherein said first terminal end includes a first pair of openings having a configuration conforming to the first pair of protruding shafts on the first terminal end of said first semicircular shaped structure and said second terminal end includes a second pair of openings having a configuration conforming to the second pair of protruding shafts on the second terminal end of said second semicircular shaped structure;

a top edge forming an upper semicircular rim having a surface perpendicular to the longitudinal axis of said second semicircular shaped structure, a bottom edge forming a lower semicircular rim having a surface perpendicular to the longitudinal axis of said second semicircular shaped structure, said top edge and said bottom edge residing in spaced apart horizontal planes with respect to each other;

a second outer circumferential side separating said top edge and said bottom edge;

one or more notches in the upper surface of said outer circumferential side intermediate said pair of terminal ends; and one or more spaced apart openings in the lower surface of said second semicircular shaped structure;

wherein said first semicircular shaped structure and said second semicircular structure are locked together at said first and said second pair of terminal ends in a simple one-motion step by pushing said structures together until locking of said structures is accomplished, said locking being accomplished in the absence of a separate annular locking structure.

17. The fuel filler system of claim 16 wherein said plastic collar is made from a polymeric material selected from the group consisting of polypropylene, high density polyethylene, nylon, polyethyleneterephthalate and halogenated polyolefins.

18. The fuel filler system of claim 17 wherein said polymeric material is polypropylene.

19. The fuel filler system of claim 16 wherein said elbow-shaped tubular structure is integrally formed on said first semicircular structure.

20. The fuel filler system of claim 16 wherein said first semi-circular shaped structure further comprises a vent tube having a first end connected to said elbow-shaped tubular member and a second end connected to a fuel vapor adsorption canister, for transporting fresh air therefrom.

* * * * *